Dec. 18, 1956 J. C. RABASEDA 2,774,385
VALVE CAP

Filed July 13, 1954 2 Sheets-Sheet 1

INVENTOR.
J. Costas Rabaseda
BY
ATTYS.

Dec. 18, 1956  J. C. RABASEDA  2,774,385
VALVE CAP
Filed July 13, 1954  2 Sheets-Sheet 2

INVENTOR.
J. Costas Rabaseda
BY
ATTYS.

United States Patent Office

2,774,385
Patented Dec. 18, 1956

2,774,385

VALVE CAP

Juan Costas Rabaseda, Barcelona, Spain

Application July 13, 1954, Serial No. 442,995

3 Claims. (Cl. 138—89.3)

The present invention relates to a valve cap which is featured in that it comprises a cylindrical inner member provided with a threaded drill hole adapted for engagement with the outer threads of a pneumatic inner tube valve stem, an outer member guided for free rotation over the inner member and a coupling and retaining device operatively connecting both members to one another so that the inner member only can be drawn by the outer member in the direction of locking the cap onto the valve, the exposed parts of the inner member being exclusively provided with means engageable by a loosening tool or key so that the cap cannot be unscrewed in the absence of such tool or key.

According to a further embodiment of the invention the coupling and retaining device, formed of two correlated members, has the one said members developed as a ratchet pawl with a sharp point, and the facing surface of the other member is made of a material softer than the material constituting the other member, whereby the sharp point of the one member bites the opposite surface of the other member every time an attempt is performed to rotate the cap in the direction of locking it, thus drawing it and furthermore producing a small notch or indentation serving thereafter to carry out the engagement in further locking operations. In this manner is obtained a true ratchet coupling with no manufacturing operation devoted to the formation of the ratchet teeth. These, in fact, are engraved by the one member of the coupling on the other member during the actual utilization of the cap.

The invention will be described hereafter with reference to the accompanying drawings in which two preferred embodiments of the invention have been shown by way of example.

Figure 1:
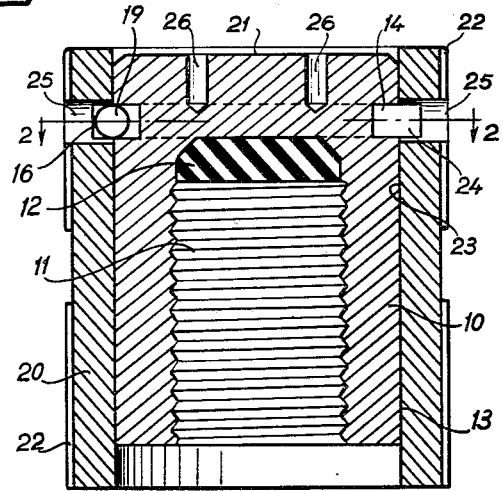
Figure 1 is an elevational diametral section of the cap.
Figure 2:
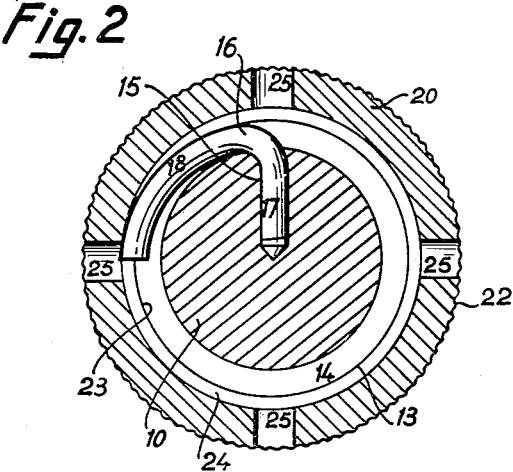
Figure 2 is a section on the line 2—2 of Figure 1.

The cap illustrated only by way of example in Figures 1 and 2 comprises an inner cylindrical member 10 which has a drill hole 11 formed with an inner thread corresponding to the outer pitch of the inner tube valve stems for automobile and the like pneumatic tires for the purpose of allowing mounting thereon a closing cap. Within the hole 11 may be arranged the means commonly utilized to obtain a thoroughly tight closure in the usual valve caps, such as a rubber gasket 12.

The outer surface 13 of the member 10 is completely cylindrical except in that it shows a shallow peripheral annular recess or groove 14 near to the upper end thereof and generally above the bottom of the hole 11 with the purpose which will be apparent hereafter.

A drill hole 15 extends radially from the bottom of the annular recess or groove 14 to about the axis of the cap and has a diameter substantially as, or slightly smaller than the width of the throat.

A piece of steel wire or other elastic material, generally shown with the reference numeral 16, is plugged into said drill hole 15 by means of a straight portion 17 provided at the one end thereof.

The remainder of the piece 16 is bent as better shown at 18, with a radius slightly greater than the outer radius of the member 10. The transition between these straight and bent portions of the piece 16 takes place abruptly and the composite angle formed by both the said portions is such that the straight portion 17 may be taken as about a radius of the bent portion 18. In such a manner, the straight portion 17 being plugged into the hole 15, the bent portion 18 may be fitted within the annular recess or groove 14.

In such condition, the end of the bent portion 18, which is abruptly cut for the purpose of providing a retaining or ratchet tooth 19, tends to protrude resiliently from the lateral surface of the member 10.

An outer member or sleeve 20 is fitted snugly over said member 10 and covering it substantially on its entire length, so that, being thoroughly smooth the upper exposed portion 21 of the member 10, this can only be operated as described hereafter, intermediate this sleeve 20 which, to this end is provided with outer knurlings 22 or other surface accidents allowing its easy grasping by the operator's hand.

The inner surface 23 of the sleeve 20 is formed with a peripheral annular recess or groove 24 located at the height of the annular recess or groove 14 of member 10, and from that annular recess or groove radial drill holes 25 lead to the outside of the cap. The width of the annular recess or groove 14 is suitable to receive in engagement the bent portion 18 of the spring 16 so that upon simultaneous play of the spring in the annular recesses or grooves 14 and 24 it serves as a guide means which restricts the motion of the sleeve 20 to a rotation of the same over the member 10, without the possibility of axial displacement. On the other hand, the retaining tooth 19 tends to engage with the bottom of the annular recess or groove 24 so that when facing any one of the holes 25 it will engage it and this coupling only can be released by turning the sleeve 20 in a specific direction with respect to the inner member 10.

Thus, it will be understood that if the ratchet tooth 19 is directed opposite to the pitch of the threads in the hole 11, when the sleeve 20 is revolved in clockwise direction, the tooth 19 will engage with the first drill hole 25 met and thereafter the member 10 will be drawn in the same direction to tighten the cap onto the valve. Once the cap is tightened enough, the opposite or anticlockwise rotation of the sleeve 20 will not be transferred to the member 10 since the ratchet tooth 19 will escape freely from all the holes 25 with which it may engage, so that for loosening the cap it will be necessary to actuate on the member 10 directly.

Once the described cap is coupled to an inner tube valve, the upper surface 21 of member 10 is the only accessible one and the cap cannot be unscrewed without the use of a special tool, thus avoiding that children may tamper with the valve to deflate the inner tube.

Loosening of the cap can, however, be done by means of a key provided with axial pins, which may be engaged with two holes 26 formed on the surface 21. Since the diameter and spacing of such holes is comparatively small, at least out of the normal ranges of such keys, the operation of the cap by non-authorised persons is far less probable.

Figure 3:
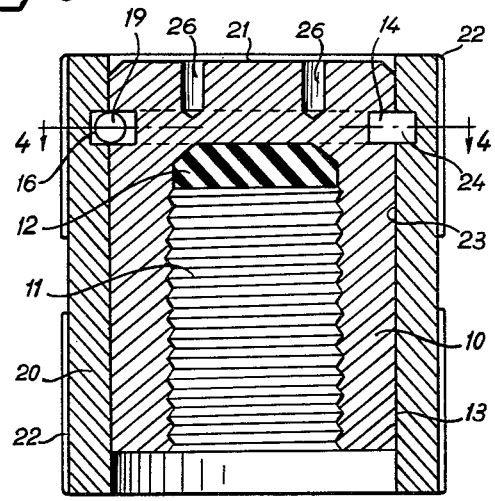
Figure 3 shows, as in Figure 1, a further embodiment.
Figure 4:
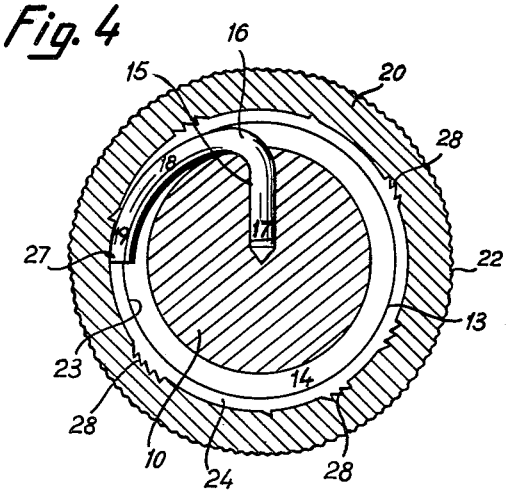
Figure 4 is a section on the line 4—4 of Figure 3.

Figures 3 and 4 show a slight modification of the cap described with reference to Figures 1 and 2. In the following description, equivalent parts are numbered as previously.

In this modification, the holes 24 are dispensed with so that the annular recess or groove 24 is thoroughly smooth.

The outer member 20 is made of a substantially soft material such as aluminium or brass, whilst the elastic member 16 is made of a substantially hard material as steel, and is formed at the tip of the bent portion 18 thereof with a sharp edge 27 pointed outwardly. Thus the edge 27 tends to protrude from the lateral surface of the member 10 due to the elasticity of the material forming the piece 16 and to the outline of said member.

When the sleeeve 20 is rotated against the end 19 of the spring described, the edge 27 of said end bites slightly the material of the sleeve 20 thus forming a small notch 28 which serves very well to draw the spring 16 and the member 10, thereby screwing the latter onto the valve. Once the desired locking pressure is attained, if the sleeve 20 is rotated in the opposite direction the tooth 19 slides freely on the bottom of the annular recess or groove 24 without neither drawing the member 20 nor further engaging the notch 28. In further locking operations, additional notches are being formed which contribute to improve the engagement of the parts described.

It is obvious, of course, that various modifications such as shape and size as well as suitable materials can be utilized in the present invention without departing from the scope thereof as defined in the appended claims.

I claim:

1. A valve cap comprising a cylindrical member provided with a threaded drill hole adapted for engagement with the outer threads of a pneumatic inner tube valve stem and having an end wall opposite the hole, an outer member provided with open ends guided for free rotation over the cylindrical member, a coupling and retaining device operatively connecting said members so that after the cylindrical member has been turned by the outer member to tightly screw the cap onto the valve stem, turning movement of the outer member in the opposite direction is not imparted to the cylindrical member, and means on the end wall of the cylindrical member engageable by a loosening key, so that the cap cannot be unscrewed in the absence of such key, the coupling and retaining device including a piece resiliently connected to one of said members and formed with a sharp end permanently contacting the facing surface in the other member, the material forming said facing surface being softer than the material forming the sharp end, whereby the latter may bite into said surface thus forming notches with which it is engaged operatively for locking the cap.

2. A valve cap comprising a cylindrical member provided with a threaded drill hole adapted for engagement with the outer threads of a pneumatic inner tube valve stem and having an end wall opposite the hole, an outer member provided with open ends guided for free rotation over the cylindrical member, the cylindrical and outer members having peripheral grooves respectively, facing one another, a coupling and retaining device located in said grooves and operatively connecting the cylindrical and outer members so that after the cylindrical member has been turned by the outer member to tightly screw the cap onto the valve stem, turning movement of the outer member in the opposite direction is not imparted to the cylindrical member, and means on the end wall of the cylindrical member engageable by a loosening key, so that the cap cannot be unscrewed in the absence of such key, the coupling and retaining device having one end thereof retained in a cavity provided at the bottom of the groove in the cylindrical member and a resiliently yielding portion at the other end engageable with holes recessed from the bottom of the groove of the outer member.

3. A valve cap as claimed in claim 2, in which the resiliently yielding portion of said coupling and retaining device is defined as a ratchet pawl.

References Cited in the file of this patent

UNITED STATES PATENTS

| | | |
|---|---|---|
| 677,592 | Patrick | July 2, 1901 |
| 1,767,884 | Heinrich | June 24, 1930 |
| 2,179,045 | Lewis | Nov. 7, 1939 |
| 2,463,378 | Hallerstrom | Mar. 1, 1949 |
| 2,551,000 | Horton | May 1, 1951 |
| 2,597,546 | Teepell | May 20, 1952 |